May 20, 1969  N. G. DILLMAN  3,445,667
PHOTOSENSITIVE SEMICONDUCTOR DEVICE FOR OBTAINING
LIGHT SOURCE POSITION DATA
Filed Sept. 20, 1965

INVENTOR.
NORMAN G. DILLMAN
BY Edward Dugas
AGENT

United States Patent Office 3,445,667
Patented May 20, 1969

3,445,667
PHOTOSENSITIVE SEMICONDUCTOR DEVICE FOR OBTAINING LIGHT SOURCE POSITION DATA
Norman G. Dillman, Rolla, Mo., assignor to North American Rockwell Corporation, a corporation of Delaware
Filed Sept. 20, 1965, Ser. No. 488,485
Int. Cl. H01j 39/12; G01j 1/20
U.S. Cl. 250—211
9 Claims

ABSTRACT OF THE DISCLOSURE

A volume effect photosensitive semiconductor device for detecting beams of radiant energy such as a light beam, wherein a spatially varying field is introduced into one of the outer layers of the volume effect device. A light beam impinging upon the photodetector portion connects the potential of the layer to the other outer layer in the position of impingement. The phase and magnitude of the output voltage is then correlated with the known characteristics of the spatially varying field to define the point of impingement.

---

This invention relates to semiconductor devices and more particularly it relates to photsensitive semiconductor devices for detecting beams of radiant energy such as light beams.

In navigation systems utilizing star trackers there exists a need for a light sensitive device for detecting the presence of a beam of light from a star and providing information as to the position of the beam of light on the light sensitive device so that the star tracker may be accurately centered or aligned with the star.

The device according to the present invention provides a sinusoidal output voltage whose magnitude is proportional to the radial position of a beam (spot) of light and the phase shift of the output voltage relative to an applied voltage is a measure of the angular position of the beam of light. This output signal may then be processed to obtain a voltage indicating the coordinate position of the beam of light on the device.

In brief, the present inventive device consists of a layer of photosensitive semiconductor material such as CdS vacuum deposited on a transparent-resistive layer of material. A conducting layer is vacuum deposited to the top of the photosensitive semiconductor layer to form a volume effect device. A plurality of A.C. potential sources having different phases are connected to the transparent-resistive layer material to obtain a spatially varying field.

A beam of light or other type of radiant energy penetrates the transparent resistive layer and impinges on the photosensitive semi-conductor layer causing the resistance of the semiconductor layer to decrease at the point of impingement. The spatially varying field at the point of impingement is thereby connected electrically to the conducting layer. A potential amplitude and phase detector detects the potential between the conductive layer and the plurality of potential sources to determine the position of the light beam.

One of the objects of the present invention is to provide a novel radiant energy beam position sensing device.

It is another object of the present invention to provide a photosensitive semiconductor device having as an output a signal indicative of the position of a beam of radiant energy impinging on said device.

It is a further object of the present invention to provide a unique semiconductor device for detecting the position of a beam of light.

These and other objects will become more apparent when taken in conjunction with the following description and drawings in which.

Figure 1:
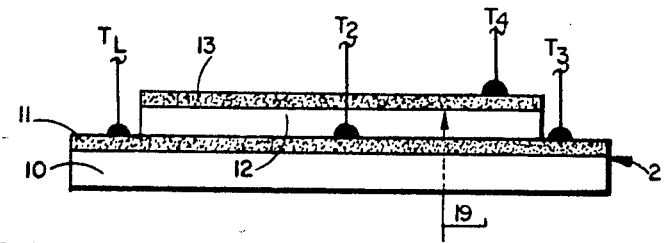
FIG. 1 is a highly magnified end view of the semiconductor device.

Referring to FIG. 1, the semiconductor device is shown comprised of a layer of transparent support material 10, such as glass, and a thin layer of transparent resistive material 11, such as tin oxide, which may be deposited on the support material 10. A photosensitive semiconductor material is vacuum deposited on the transparent-conductive layer 11 to form layer 12. A layer of conductive material 13 is applied by vacuum deposition to the top of the semiconductor layer 12 so as to sandwich layer 12 between layers 11 and 13. The conductive layer 13 need not be transparent. A lead $T_4$ is electrically connected to layer 13. Three leads $T_1$, $T_2$ and $T_3$ are electrically connected to layer 11. The number of leads connected to layer 11 may be any number N and need not be restricted to three as shown in this preferred embodiment. A beam of radiant energy, in this case a light spot 19, is shown impinging on the photosensitive semiconductor layer 12.

Figure 2:
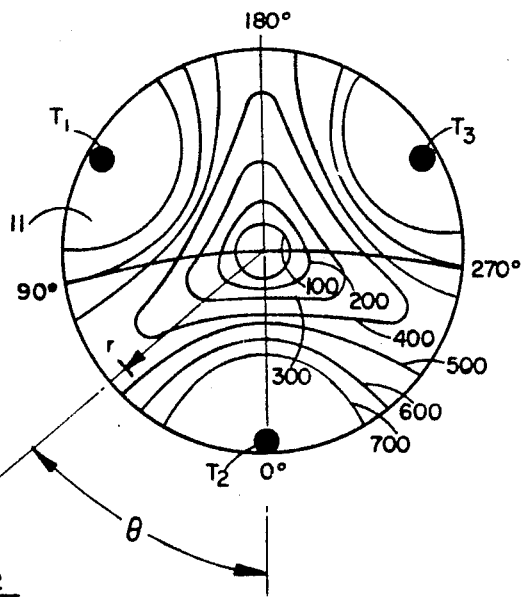
FIG. 2 is a highly magnified view of spatially varying field within the semiconductor device.
Figure 3:
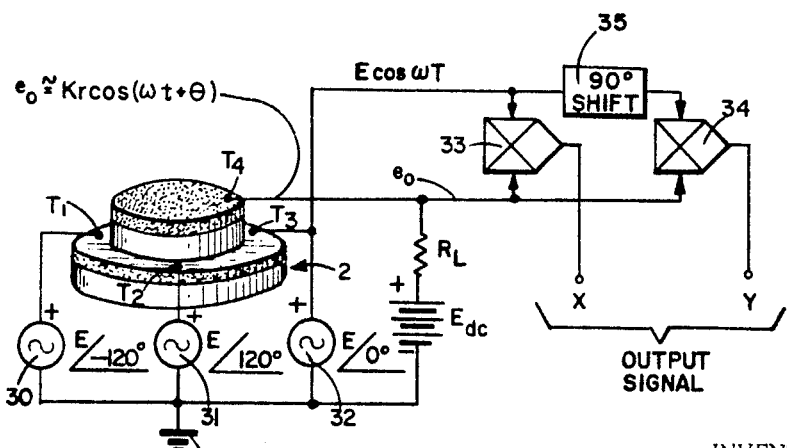
FIG. 3 is a highly magnified perspective view of the semiconductor device which includes a schematic of associated electronics.

Referring now to FIGS. 2 and 3, the spatially varying field of transparent resistive layer 11 is shown schematically with equipotential lines and lines of equal phase. The spatial field illustrated is generated by the three-phase potential sources 30, 31 and 32 electrically connected to leads $T_1$, $T_2$ and $T_3$, respectively, and the reference point (ground) 36.

Various field patterns may be created by increasing or decreasing the number of potential sources and leads connected to the transparent-conducting layer 11.

Let N leads be connected to the perimeter of the transparent-resistive layer. Each lead shall be labeled $n$ where $n = 1, 2 \ldots N$ and $N \geq 3$. The voltage applied will be:

$$e_n = A \cos\left(\omega t + \frac{2\pi n}{N}\right)$$

The example shown in FIG. 2 has three leads connected to the transparent-conducting layer 11 and therefore must have a three-phase voltage applied.

If $r$ is the radial position of the light beam on the device and $\theta$ the angle measured from the $n=N$ contact, then the potential on the transparent resistive layer 11 is approximately $e_0 \cong kr \cos(\omega t + \theta)$.

The electric potential field deviates from this expression for larger $r$ if only three voltages are applied but the expression holds quite well near the center as shown in FIG. 2.

The position of a light beam penetrating the transparent-conducting layer 11 and impinging on the layer of photosensitive semiconductor material 12 is obtained by "connecting" the potential of the illuminated region of the transparent-resistive layer 11 to the conductive layer 13. The "connection" is made because the semiconductor material 12 is photoconductive and the resistance of the illuminated region is much lower than that of the surrounding semiconductor material. The voltage at the contact $T_4$ is the voltage at the transparent-resistive layer that uniquely defines the position of the light beam.

It may be desirable in many applications to know that a beam of light is shining on the device because of the fact that there is a null obtained when the beam is at the electrical center of the device (potential amplitude ring 100 in FIG. 2). A presence signal may be achieved by connecting a DC bias, $E_{dc}$ to the device through a load resistor $R_L$ as shown in FIG. 3. The DC output signal at the contact $T_4$ is approximately $E_{dc}$ with no illumination because the semiconducting film resistance which may be designated $R_p$ is much greater than the load resistance $R_L$. When the device is illuminated by a small light beam (spot) $R_p \ll R_L$ and the DC output signal is then nearly zero. The position signal is sinusoidal and therefore independent of the presence signal.

In FIG. 2 nominal equipotential lines are designated 100, 200, 300, 400, 500, 600 and 700. Lines of equal phase are designed 0°, 90°, 180° and 270°.

The output signal in the presence of a light beam at position $(r, \theta)$ is approximately $e_o = \cong kr \cos(\omega t + \theta)$ where $k$ is a constant indicating the radial voltage gradient on the transparent-conducting layer. One means of obtaining signals indicating the orthogonal position $x = r \cos \theta$ and $y = r \sin \theta$ requires the use of two multipliers 33 and 34 or synchronous demodulators (not shown) and a circuit to introduce a 90 degree phase shift 35 in the reference signal, $E \cos \omega t$. This system is shown in FIG. 3. It will be obvious to persons skilled in the art that many variations in the means of detecting the signal $e_o$ are possible.

If the device is to be used as a nulling device, the applied voltages are not critical so long as their amplitudes change together, i.e., if the magitude of only one changes, the position of the null voltage on the transparent conducting layer will also change and introduce an error in position.

Distortion of the field pattern on the transparent-conducting layer because of a finite number of contacts on the perimeter will introduce an error as $r$ gets larger. This error would not affect a nulling device and might be improved for applications requiring the actual position of the spot of light by increasing the number of perimeter contacts or by decreasing the resistance per square in the vicinity of the perimeter contacts to compensate for the increased density there.

The resistance per square of the transparent-resistive layer should be low enough that the current flowing into the photosensitive semiconducting material and through the load resistance $R_L$ will be negligible with respect to the exciting current. This may be limited by power considerations.

If $R_s$ (dark) is the resistance of dark photosensitive semiconductor material, $R_s$ (light) is the resistance of the illuminated area of the photosensitive semiconductor material and $R_L$ is the load resistance, then $$R_s \text{ (dark)} \gg R_L \gg R_s \text{ (light)}$$

This insures that the output will assume the potential of the transparent conductive layer where illuminated.

In the above description layer 11 has been described as a transparent-resistive material; it may also be a translucent-resistive material without departing from the scope of the invention. Further, layer 13 may obviously also constitute the transparent or translucent layer in which case layer 11 need not be transparent or translucent.

The above description is of a preferred embodiment of the invention and many modifications may be made thereto without departing from the spirit and scope of the invention which is limited only as defined in the appended claims.

What is claimed is:

1. A solid state device comprising:
   a first layer of translucent electrically resistive material;
   a second layer of electrically conducting material, at least one of said first and second layers being light transmitting;
   a plurality of potential sources connected at mutually spaced positions to said resistive layer, said plurality of potential sources differing in phase, said plurality of potential sources creating a spatially varying field within said first layer of resistive material;
   a layer of photosensitive semiconductor material positioned between and in electrical contact with said first and second conducting layers; and
   detecting means connected between said electrically conducting layer and said potential means for indicating the potential at a point on said resistive layer.

2. A solid state device comprising:
   a first layer of translucent electrically resistive material;
   a plurality of A.C. potential sources connected at mutually spaced positions to said resistive layer, each connected to a common reference potential, each having a different phase, whereby a spatially varying field is created within said layer of translucent material;
   a second layer of electrically conducting material;
   a layer of photosensitive semiconductor material positioned between and in electrical contact with said first and second layers; and
   detecting means connected between said second electrically conducting layer and said common reference potential for detecting the amplitude and phase of the potential between said second conducting layer and said common reference potential.

3. The solid state device of claim 2 further comprising:
   a load having at least two electrical contacts, one of said contacts connected to said layer of electrically conducting material; and
   a source of D.C. potential serially connecting the other contact of said load to said plurality of A.C. potential sources so as to provide a D.C. level in said spatially varying field.

4. A solid state position detector providing a signal indicative of the position of a beam of radiating energy impinging on a photosensitive semiconductor material comprising:
   a first layer of transparent electrically resistive material;
   a photosensitive semiconductor material deposited on said transparent resistive material;
   a second layer of conductive material deposited on said photosensitive semiconductor material;
   a plurality of potential sources of different phase attached to said transparent resistive material so as to create a spatially varying field therein; and
   means connected across said second layer of conducting material and said potential sources for detecting the potential at a point on said transparent conducting material corresponding to the position of said impinging beam of radiating energy.

5. A semiconductor device for detecting the position of a beam of radiating energy impinging on a layer of photosensitive semiconductor material comprising in combination:
   a first layer of transparent resistive material;
   potential means comprising a plurality of potential sources of mutually differing phases for creating a spatially varying field within said first layer;
   a second layer of photosensitive semiconductive material in ohmic contact with said first layer;
   a third conductive layer in ohmic contact with said second layer and positioned on said second layer opposite said first layer; and
   detecting means connected across said potential means and said third layer, so as to detect a change in potential across said potential means and said third layer, said potential change being a two dimensional function of the position of said impinging beam of energy with respect to said spatially varying field of said first layer.

6. A semiconductor device for detecting the position of a beam of radiating energy impinging on a layer of photosensitive semiconductor material comprising in combination:
   a first transparent resistive layer, a second conductive layer and a photosensitive layer sandwiched therebetween;
   a plurality of potential sources of differing phases electrically connected to said first layer so as to create a spatially varying field within said first layer;

a second conductive layer contact; and detecting means responsive to the phase and magnitude of the potential at said second conductive layer contact for indicating the position of said beam of energy.

7. A semiconductor device for detecting the position of a beam of radiating energy impinging on a layer of photosensitive semiconductor material comprising in combination:

a layer of transparent resistive material;

a plurality of mutually spaced contacts ohmically engaging said transparent resistive material;

a plurality of A.C. potential sources corresponding in number to said plurality of contacts, each of said A.C. potential sources having a different phase and connected across one of said plurality of contacts and a reference point;

a layer of photosensitive semiconductor material deposited on said layer of transparent conducting material;

a second contact ohmically engaging said layer of photosensitive semiconductor material; and detecting means electrically connected across said second contact and said reference point providing a signal, the amplitude and phase of which is indicative of the position of said radiating beam of energy impinging on said layer of photosensitive semiconductor material.

8. A semiconductor device for detecting the position of a beam of radiating energy impinging on a layer of photosensitive semiconductor material comprising in combination:

a layer of transparent resistive material;

a layer of photosensitive semiconductor material deposited on one surface of said transparent resistive layer;

a plurality of potential sources of differing phases electrically connected at mutually spaced positions to said transparent resistive layer so as to generate a spatially varying field within said transparent resistive layer;

a first electrical contact engaging said photosensitive semiconductor material; and detecting means responsive to the phase and magnitude of the potential at said first electrical contact for providing a signal indicative of the position of said beam of radiant energy on said photosensitive layer.

9. A semiconductor device for detecting the position of a beam of an impinging beam of energy comprising in combination:

a layer of resistive material;

a layer of electrically conducting material, at least one of said layers being light transmitting;

a plurality of potential sources connected at mutually spaced positions to said resistive layer, said potential sources having the form $$e_n = A \cos\left(\omega t + \frac{2\pi n}{N}\right)$$

where: $n = 1, 2 \ldots N$ and $N \geq 3$ a layer of photosensitive semiconductor material positioned between and in electrical contact with said layer of resistive material and said layer of electrically conducting material;

detecting means responsive to the phase and magnitude of the potential level at said layer of electrically conducting material for indicating the position of said beam of energy.

References Cited

UNITED STATES PATENTS

| | | | |
|---|---|---|---|
| 2,861,262 | 11/1958 | Pankove | 250—211 X |
| 3,211,911 | 10/1965 | Ruhge | 250—203 |
| 3,310,738 | 3/1967 | Ogawa et al. | |
| 3,340,763 | 9/1967 | Power | 250—211 X |
| 3,351,493 | 11/1967 | Weiman et al. | 250—203 X |

OTHER REFERENCES

Table 5d–3 of American Institute of Physics Handbook pp. 5–112 and 5–113.

RALPH G. NILSON, *Primary Examiner.*

T. N. GRIGSBY, *Assistant Examiner.*

U.S. Cl. X.R.

250—203